US011940234B2

(12) United States Patent
Tobiassen et al.

(10) Patent No.: US 11,940,234 B2
(45) Date of Patent: Mar. 26, 2024

(54) SENSOR HOUSING

(71) Applicant: MOTIONAL AD LLC, Boston, MA (US)

(72) Inventors: Thorin Tobiassen, Pittsburgh, PA (US); Andrew Timothy Moore, Pittsburgh, PA (US); Christopher P. Bird, Carnegie, PA (US); Justin D'Antonio, Pittsburgh, PA (US); Dexter Lee Stoltz, Emsworth, PA (US)

(73) Assignee: Motional AD LLC, Boston, MA (US)

( * ) Notice: Subject to any disclaimer, the term of this patent is extended or adjusted under 35 U.S.C. 154(b) by 296 days.

(21) Appl. No.: 17/004,644

(22) Filed: Aug. 27, 2020

(65) Prior Publication Data

US 2021/0063093 A1 Mar. 4, 2021

Related U.S. Application Data

(60) Provisional application No. 62/893,490, filed on Aug. 29, 2019.

(51) Int. Cl.
*G01S 17/88* (2006.01)
*F28F 3/02* (2006.01)
*G06F 1/20* (2006.01)

(52) U.S. Cl.
CPC ............... *F28F 3/02* (2013.01); *G01S 17/88* (2013.01); *G06F 1/20* (2013.01)

(58) Field of Classification Search
CPC .......... F28F 3/02; G01S 17/88; G01S 17/931; G06F 1/20
See application file for complete search history.

(56) References Cited

U.S. PATENT DOCUMENTS

| 4,658,599 | A | 4/1987 | Kajiwara |
| 5,814,908 | A | 9/1998 | Muszynski |
| 5,937,664 | A | 8/1999 | Matsuno et al. |
| 8,206,204 | B2 | 6/2012 | Bryant et al. |
| 8,319,408 | B1 * | 11/2012 | Horng ...................... F21V 3/00 362/546 |
| 8,527,095 | B2 | 9/2013 | Kikuchi et al. |

(Continued)

FOREIGN PATENT DOCUMENTS

| CN | 201365389 Y | 12/2009 |
| CN | 202310418 U | 7/2012 |

(Continued)

OTHER PUBLICATIONS

Chinese Office Action issued for Application No. CN 202010885704.7 dated Mar. 29, 2022.

(Continued)

*Primary Examiner* — Devon Russell
(74) *Attorney, Agent, or Firm* — Knobbe, Martens, Olson & Bear, LLP

(57) ABSTRACT

The subject matter described in this specification is directed to systems and methods for dissipating heat from sensors supporting autonomous vehicle systems. In particular, the specification describes how a housing, enclosing a sensor mounted to an exterior of a vehicle, can include heat dissipation components such as cooling fins across which conditioned cabin air and/or ambient air can be driven to convectively dissipate heat generated by the sensor.

11 Claims, 20 Drawing Sheets

(56) References Cited

U.S. PATENT DOCUMENTS

| | | | |
|---|---|---|---|
| 9,914,336 B2 | 3/2018 | Smith | |
| 10,729,034 B2 * | 7/2020 | Zaindl | H05K 7/20209 |
| 2006/0102403 A1 | 5/2006 | Inoguchi et al. | |
| 2007/0095086 A1 | 5/2007 | Tsuneishi et al. | |
| 2008/0062038 A1 | 3/2008 | Ouchi et al. | |
| 2008/0139102 A1 | 6/2008 | Major | |
| 2009/0199997 A1 | 8/2009 | Koplow | |
| 2010/0117480 A1 | 5/2010 | Ishizuka et al. | |
| 2011/0083446 A1 * | 4/2011 | Pinet | F25B 21/02 62/3.6 |
| 2011/0165830 A1 | 7/2011 | Smith | |
| 2011/0165832 A1 | 7/2011 | Smith | |
| 2013/0052490 A1 | 2/2013 | TenHouten et al. | |
| 2013/0215571 A1 * | 8/2013 | Miyamoto | B60L 1/003 327/512 |
| 2013/0337296 A1 | 12/2013 | Cardoso | |
| 2015/0055297 A1 | 2/2015 | Chilek et al. | |
| 2016/0159246 A1 | 6/2016 | Jung et al. | |
| 2017/0174037 A1 | 6/2017 | Meyhofer et al. | |
| 2017/0261273 A1 * | 9/2017 | Maranville | F25B 1/00 |
| 2017/0297407 A1 | 10/2017 | Shan et al. | |
| 2018/0109061 A1 * | 4/2018 | Pardhan | H05K 7/2039 |
| 2018/0335622 A1 * | 11/2018 | Trebouet | H04N 5/2252 |
| 2018/0345758 A1 | 12/2018 | Oh et al. | |
| 2019/0154799 A1 | 5/2019 | Schmidt | |
| 2019/0278078 A1 * | 9/2019 | Krishnan | G02B 27/0006 |
| 2020/0094647 A1 * | 3/2020 | Shibata | B60K 37/00 |
| 2021/0068312 A1 | 3/2021 | Tobiassen et al. | |

FOREIGN PATENT DOCUMENTS

| | | | |
|---|---|---|---|
| CN | 103458653 A | 12/2013 | |
| CN | 204014404 U | 12/2014 | |
| CN | 104766478 A | 7/2015 | |
| CN | 204761102 U | 11/2015 | |
| CN | 105392674 A | 3/2016 | |
| CN | 208046472 U | 11/2018 | |
| CN | 208168965 U | 11/2018 | |
| CN | 109237427 A | 1/2019 | |
| CN | 208962866 U | 6/2019 | |
| DE | 10 2013 004 007 A1 | 9/2014 | |
| EP | 1473193 A1 | 11/2004 | |
| EP | 2548754 A1 | 1/2013 | |
| EP | 2730453 A2 | 5/2014 | |
| JP | 2002-254924 A | 9/2002 | |
| JP | 2003-326961 A | 11/2003 | |
| JP | 2008-055929 A | 3/2008 | |
| JP | 2008-055990 A | 3/2008 | |
| JP | 2008-247340 A | 10/2008 | |
| JP | 2008-247341 A | 10/2008 | |
| JP | 2011-249495 A | 12/2011 | |
| JP | 2014-168982 A | 9/2014 | |
| JP | 2016-205851 A | 12/2016 | |
| KR | 10-2008-0045377 A | 5/2008 | |
| KR | 10-2014-0072458 A | 6/2014 | |
| KR | 10-2018-0078794 A | 7/2018 | |
| TW | 453470 U | 9/2001 | |
| WO | WO 2013/180270 A1 | 12/2013 | |
| WO | WO 2016/051249 A2 | 4/2016 | |
| WO | WO-2016051249 A2 * | 4/2016 | B60H 1/00278 |
| WO | WO 2017/213573 A1 | 12/2017 | |

OTHER PUBLICATIONS

Chinese Office Action issued for Application No. CN 202010885704.7 dated May 30, 2022.
Great Britain Office Action issued for Application No. GB 2013337.7, dated Nov. 26, 2021.
Great Britain Office Action issued for Application No. GB 2013334.4, dated Feb. 16, 2021.
Great Britain Office Action issued for Application No. GB 2013334.4, dated Nov. 11, 2021.
Great Britain Office Action issued for Application No. GB 2118022.9, dated Jan. 10, 2022.
Korean Office Action issued for Application No. KR 10-2020-0108805, dated Nov. 29, 2021.
Korean Office Action issued for Application No. 10-2020-0107949, dated Jan. 30, 2022.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Chinese Office Action issued for Application No. CN 202010885704.7 dated Aug. 16, 2021.
Combined Search and Examination Report received for United Kingdom Patent Application No. 2013337.7, dated Feb. 8, 2021, 8 pages.
Great Britain Office Action issued for Application No. GB 2202882.3, dated Aug. 12, 2022.
Great Britain Office Action issued for Application No. GB 2212278.2, dated Sep. 7, 2022.
Korean Office Action issued for Application No. KR 10-2020-0108805, dated Jun. 22, 2022.
Korean Office Action issued for Application No. 10-2020-0107949, dated Aug. 30, 2022.
Chinese Office Action issued for Application No. CN 202010877870.2 dated Oct. 11, 2023.
Korean Notice of Allowance issued for Application No. 10-2020-0107949, dated Mar. 27, 2023.

* cited by examiner

SENSOR HOUSING

CROSS-REFERENCE TO RELATED APPLICATIONS

This application claims the benefit of U.S. Provisional Application No. 62/893,490, entitled "SENSOR HOUSING," filed Aug. 29, 2019, the entire contents of which are hereby incorporated by reference.

FIELD

This description relates to a system for cooling sensors associated with autonomous driving systems of a vehicle, and in particular, for convectively dissipating heat generated by the sensors.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors and electronics mounted internally and/or externally to detect and characterize objects in the surroundings.

SUMMARY

Autonomous driving sensors mounted to an exterior of a vehicle do not benefit from temperature regulation of the interior of the vehicle provided by a vehicle's HVAC system. For this reason, systems and methods for keeping the autonomous driving sensors operating within fixed temperature ranges are desirable.

The subject matter described in this specification is directed to systems and methods for dissipating heat generated by an autonomous driving sensor positioned in a sensor housing mounted to an exterior surface of a vehicle. In some embodiments, the heat generated by the sensor can be dissipated convectively from the sensor housing by ambient air or conditioned air channeled to the sensor housing from an interior of the vehicle.

An exemplary system for controlling the temperature of a sensor supporting autonomous driving disposed within an exterior mounted sensor enclosure includes: a first mounting bracket including a first duct path, the first mounting bracket configured to mount to an interior surface of a vehicle and to direct air from a cabin area of the vehicle through the first duct path; a fan coupled to the first mounting bracket, the fan positioned between the cabin area and the first mounting bracket, wherein the fan is configured to: source air from the cabin area; and direct the sourced air through both the first duct path and a duct path in a body portion of the vehicle; a second mounting bracket including a second duct path, an upper section configured to mount to a sensor (e.g. a LiDAR sensor), and a lower section, wherein the second mounting bracket is configured to: mount to an exterior surface of the vehicle; receive the sourced air from the duct path in the body portion of the vehicle; and direct the sourced air in the second direction through the second duct path, wherein the first duct path and the second duct path are positioned on opposite sides of the duct path in the body portion; and a heat sink configured to attach to the lower section of the second mounting bracket and below the sensor, wherein the second mounting bracket is configured to direct the sourced air to the heat sink via the second duct path.

An exemplary system for using conditioned air to regulate the temperature of an exterior mounted sensor includes: an enclosure configured to enclose and support a sensor (e.g. LiDAR sensor); a heat sink coupled to a base of the enclosure and configured to receive heat generated by the sensor; a mounting bracket assembly configured to secure the enclosure to an exterior surface of a vehicle, the mounting bracket assembly comprising ducting configured to define at least a portion of an airway extending from an interior of the vehicle, through a bulkhead of the vehicle and to the heat sink; and a fan configured to draw air from within a cabin area of the vehicle, push the air through the ducting and across the heat sink to control a temperature of the sensor.

An exemplary system for maintaining an operational temperature of a sensor (e.g., LiDAR sensor) includes a mounting bracket configured to mount to an exterior surface of a vehicle; a heat sink configured to couple the mounting bracket to the sensor and to support a weight of the sensor, the heat sink comprising cooling fins that define at least a portion of a duct including a first open end and a second open end, wherein the duct is configured to source air into the duct through the first open end and direct the sourced air from the first open end to the second open end to convectively dissipate heat from the heat sink to the sourced air.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
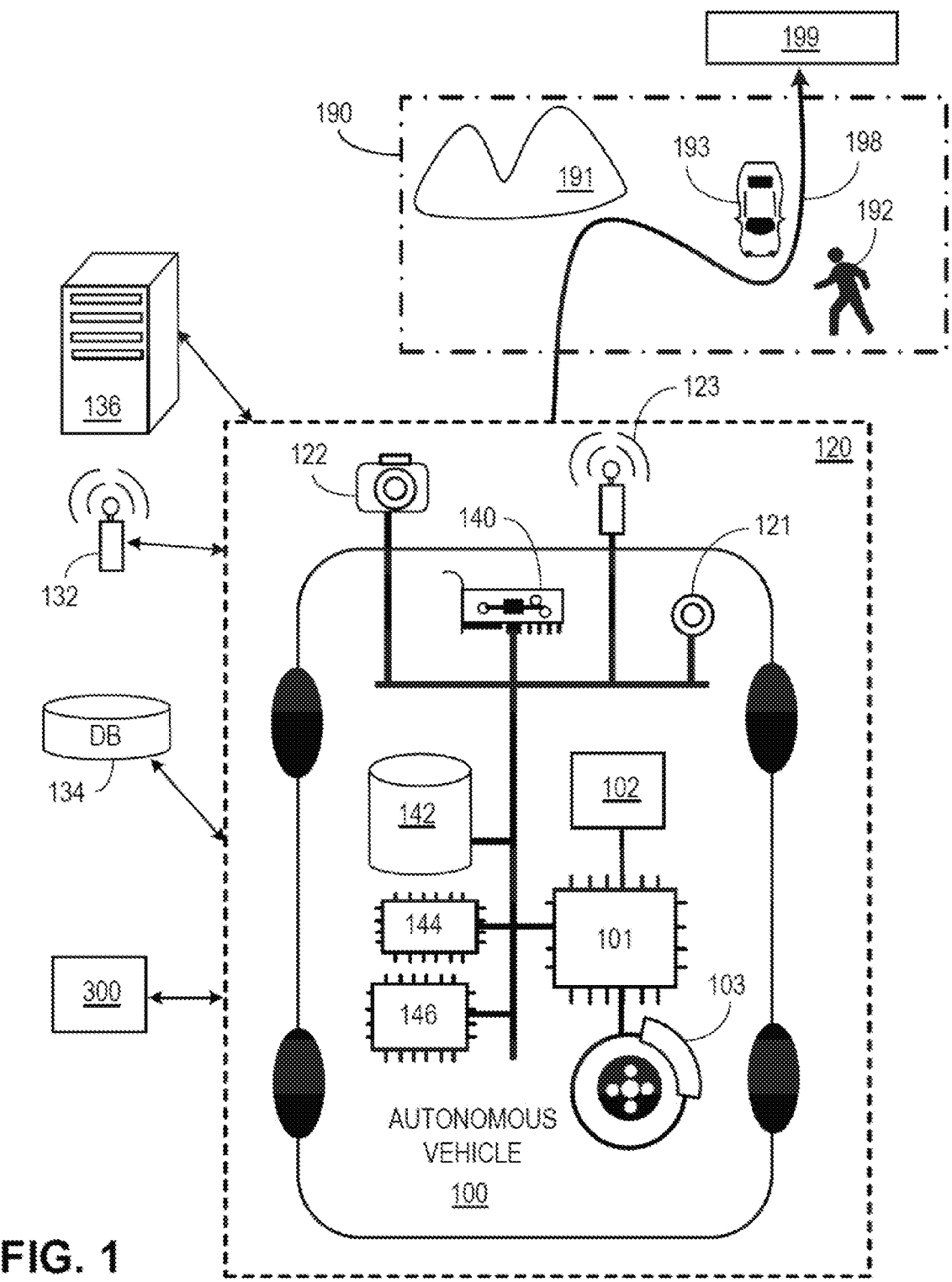
FIG. 1 shows an example of an autonomous vehicle having autonomous capability.

In the following description, for the purposes of explanation, numerous specific details are set forth. It will be apparent, however, that the disclosed techniques may be practiced without these specific details. In other instances, well-known structures and devices are shown in block diagram form in order to avoid unnecessarily obscuring the disclosed techniques.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LiDAR or RADAR. In certain situations these sensors may need to be mounted externally in which case the sensors sometimes can benefit from thermal regulation.

In particular, the systems and techniques described herein are implemented using an enclosure that includes a convective heat transfer mechanism such as a series of cooling fins. In some embodiments, the enclosure is configured with a fan to draw cabin air from within the vehicle across the cooling fins to regulate a temperature of a sensor within the enclosure. In other embodiments, the enclosure includes one or more intakes that guide ambient air across the cooling fins. In addition to the sensor enclosures, various different types of mounting brackets are described that facilitate the attachment of the enclosures to an exterior of a vehicle.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
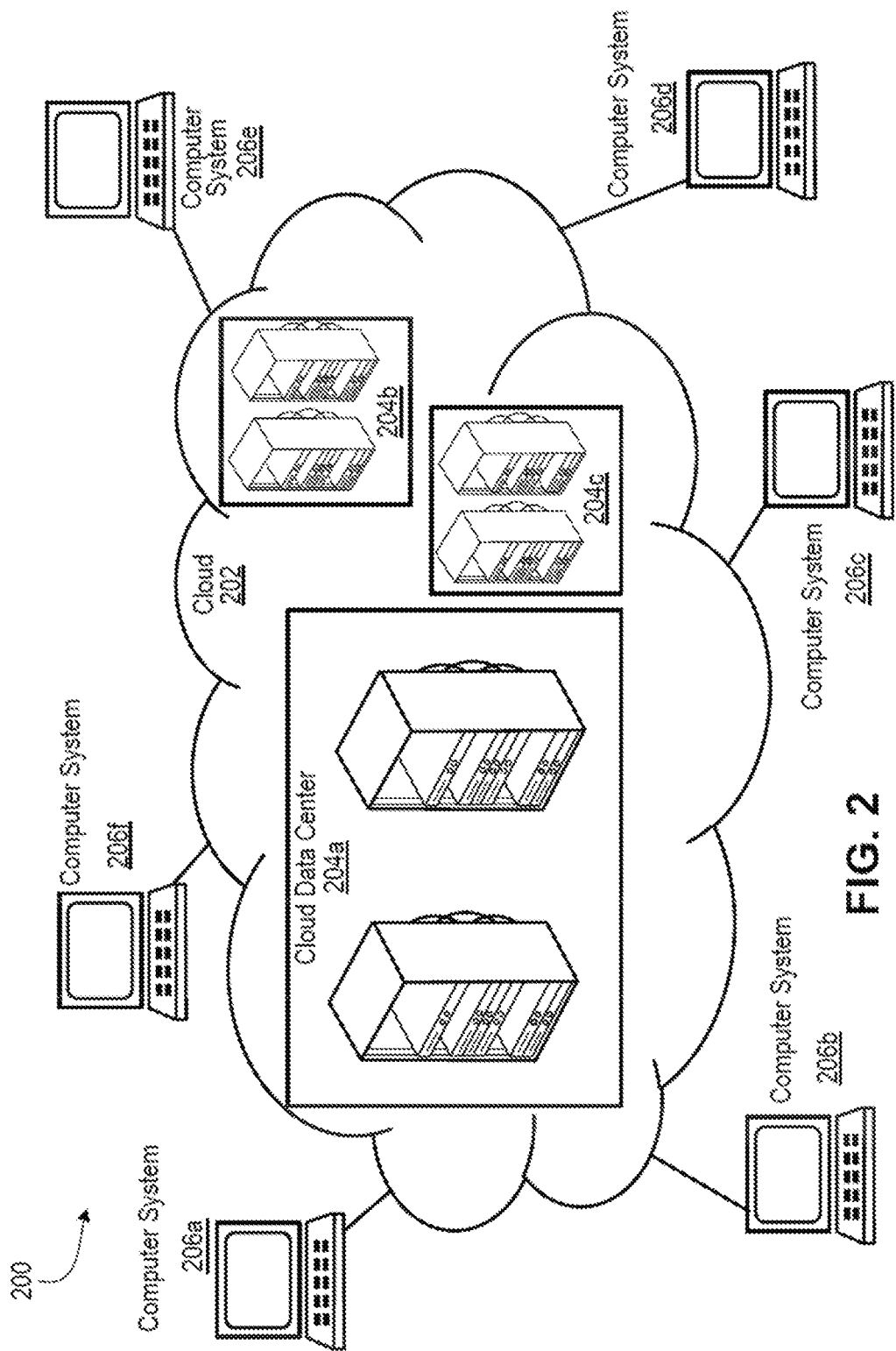
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
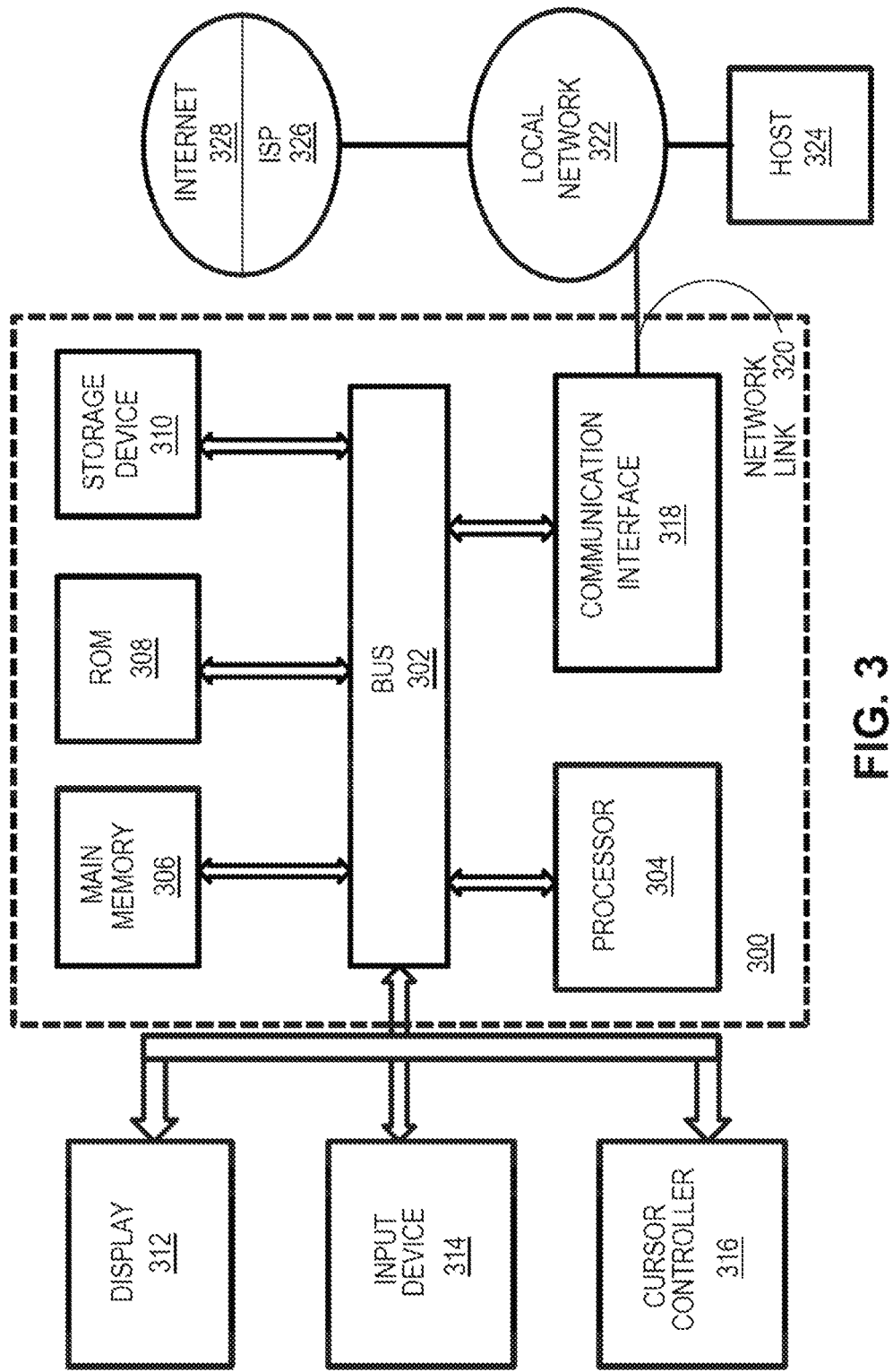
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
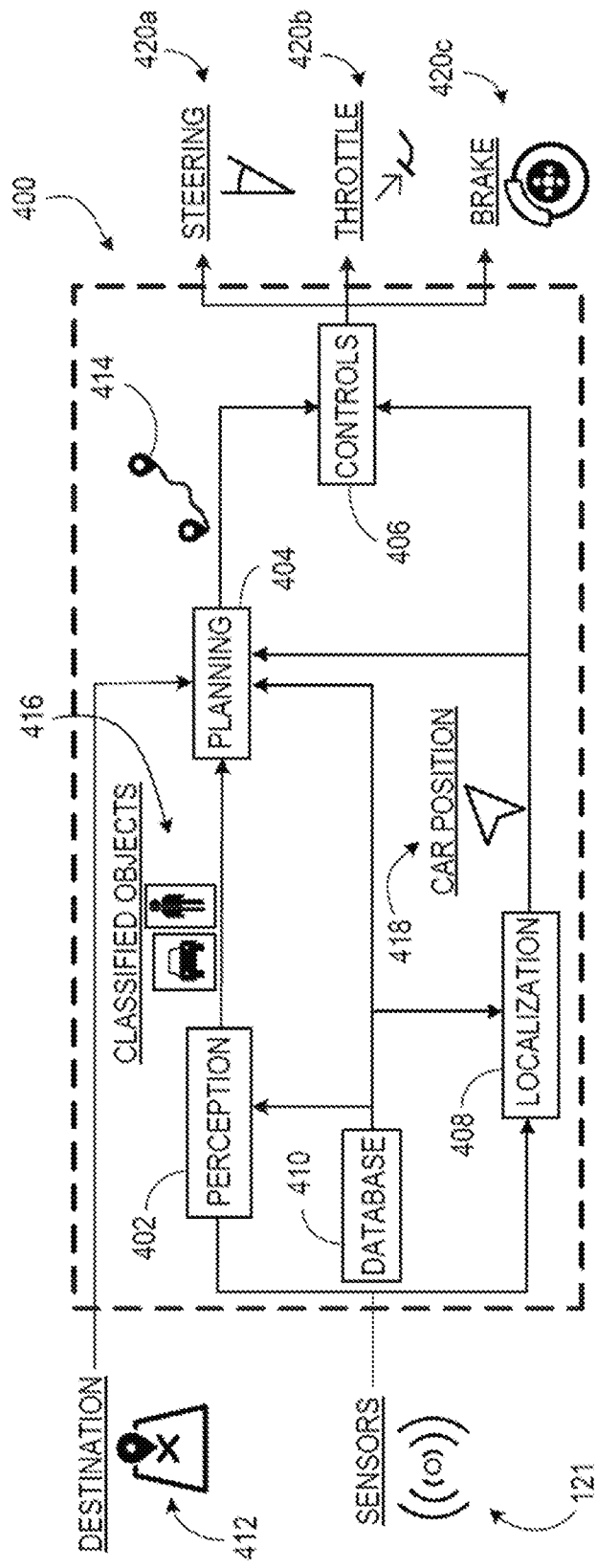
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
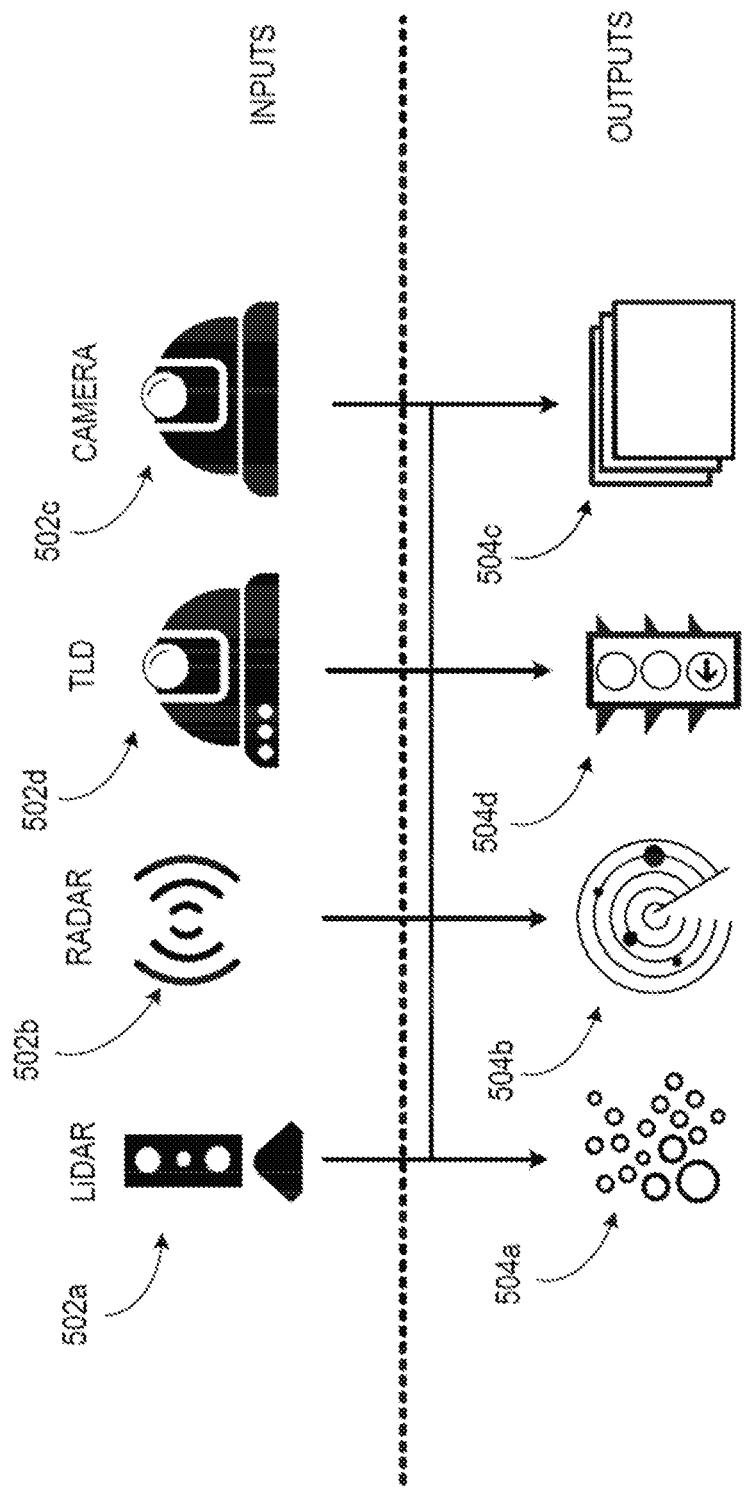
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
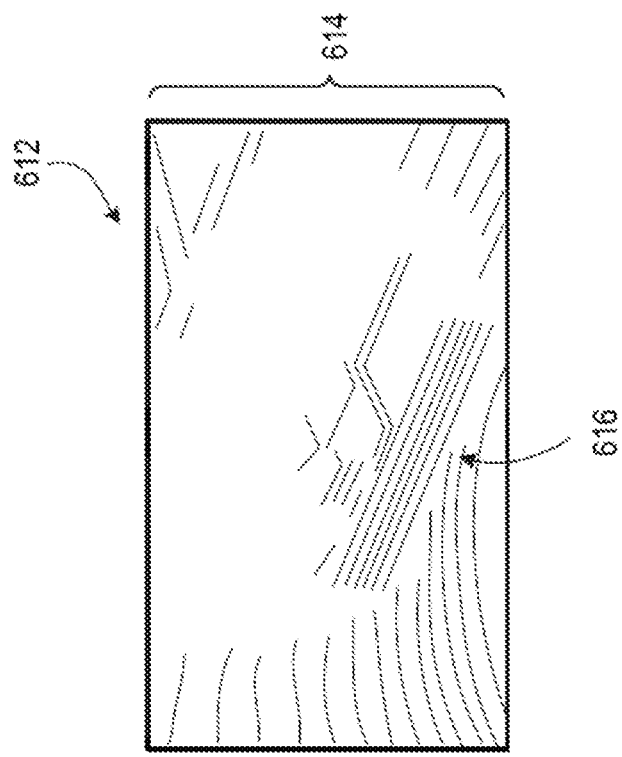
FIG. 6 shows an example of a LiDAR system.
Figure 6:
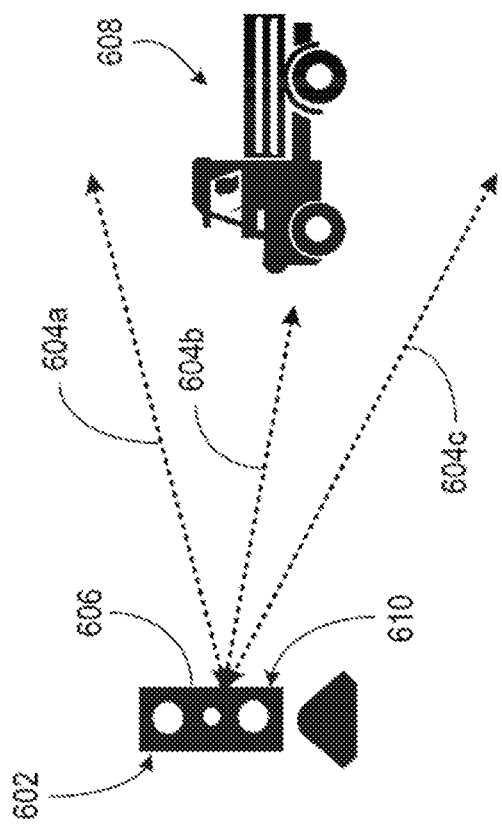

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
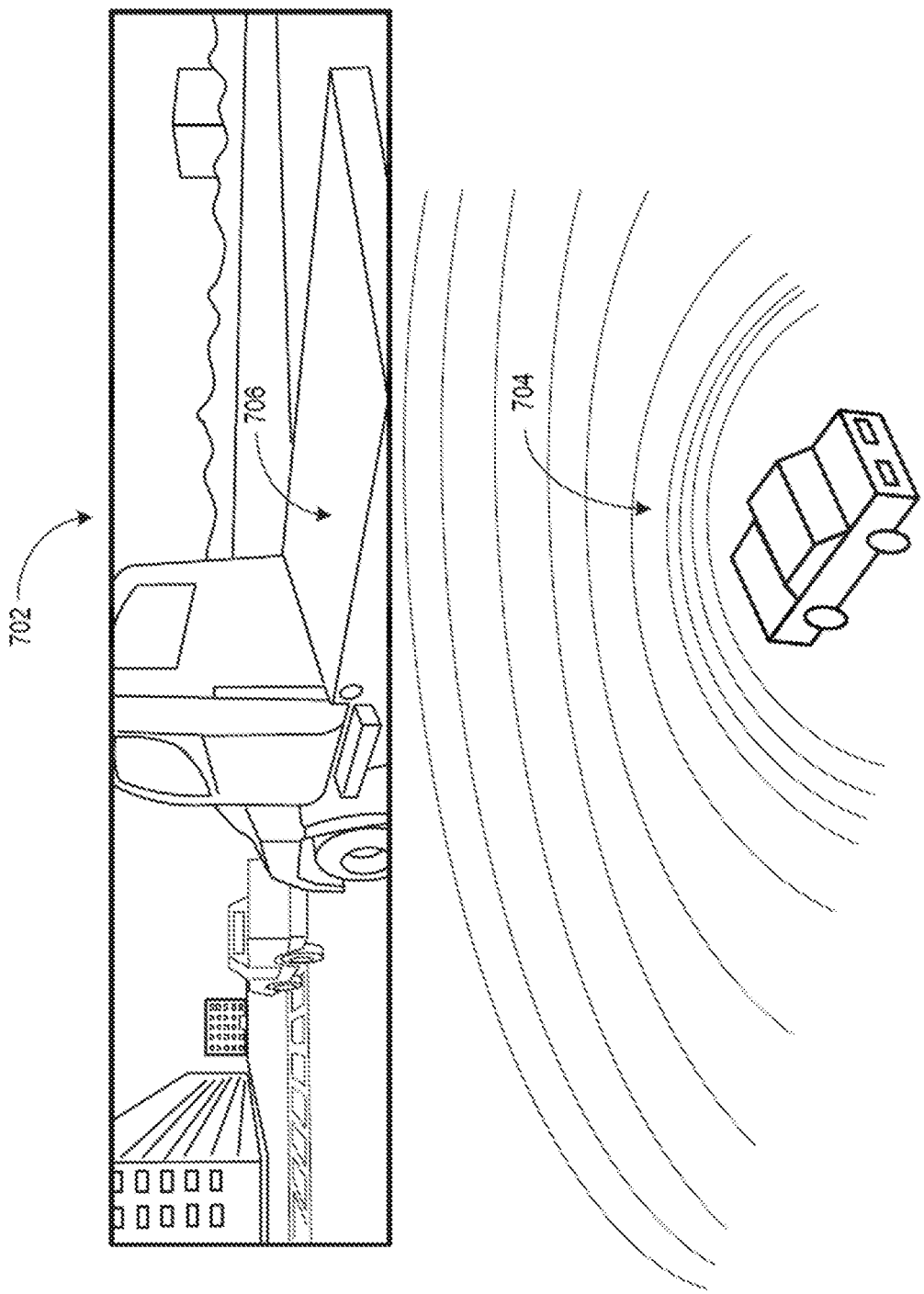
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
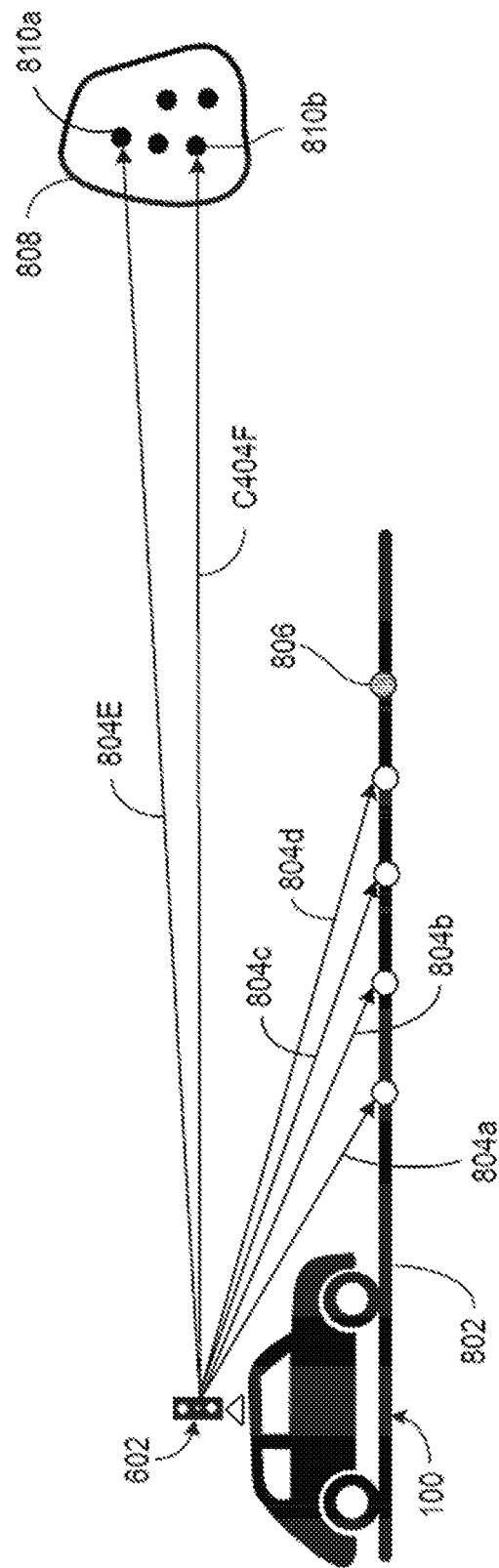
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
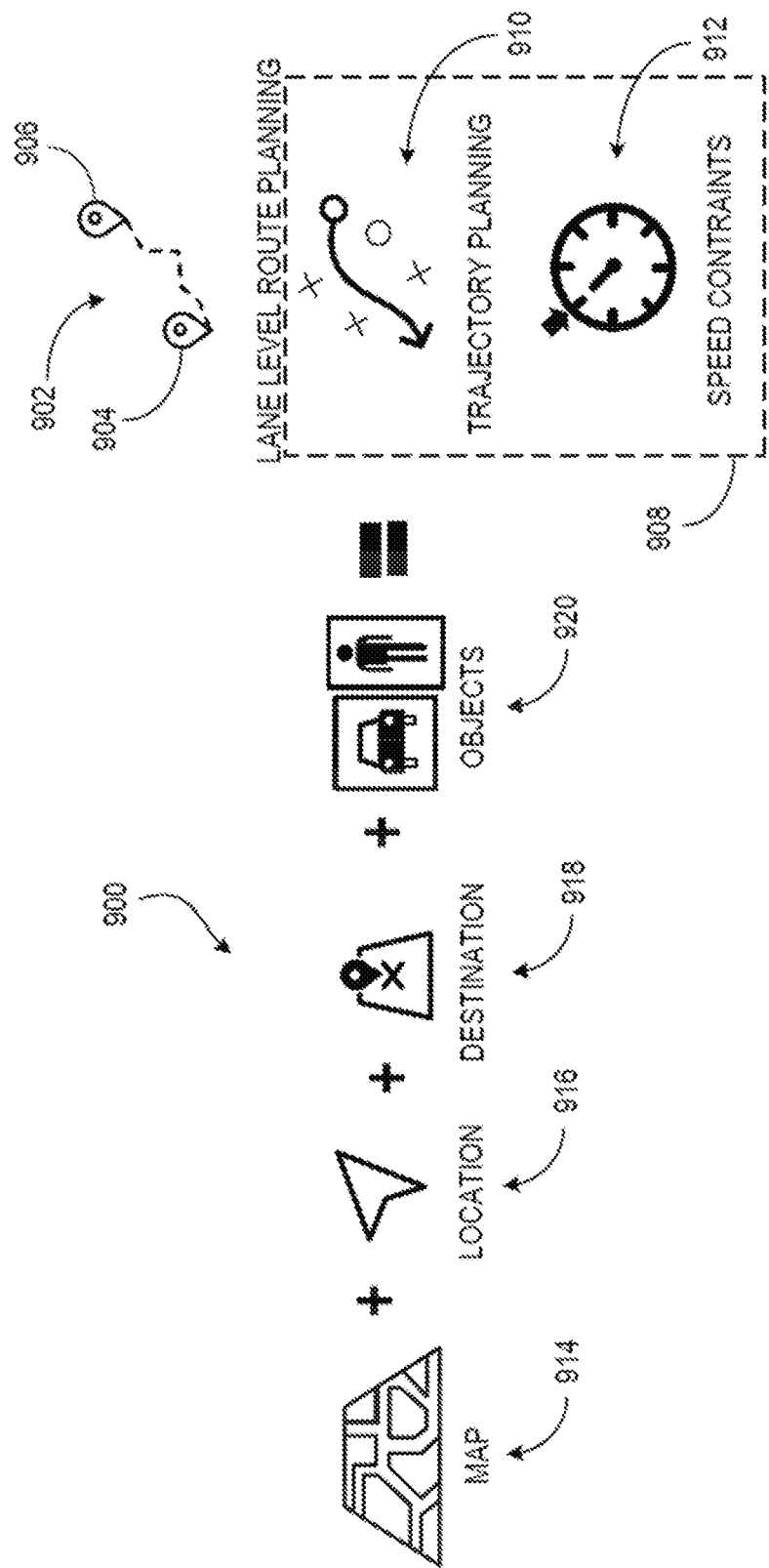
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
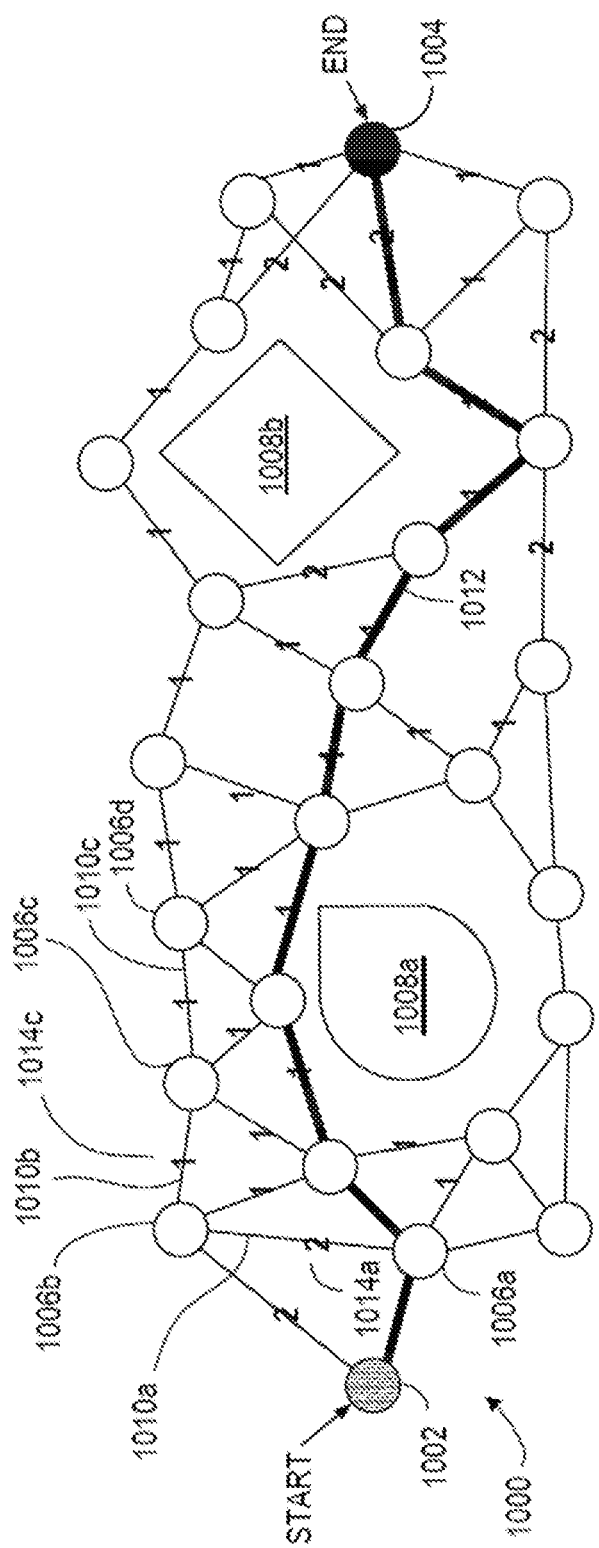
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
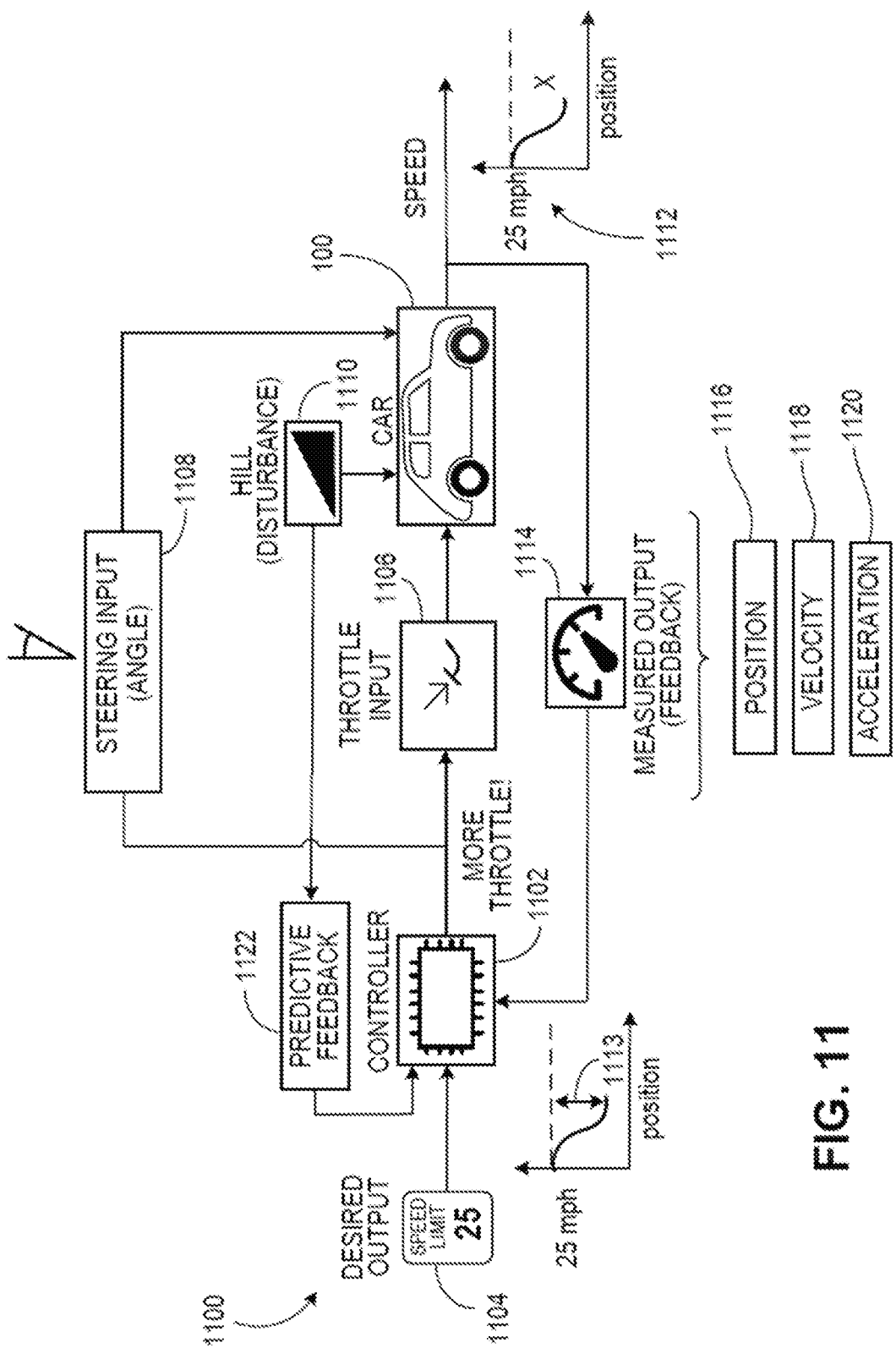
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
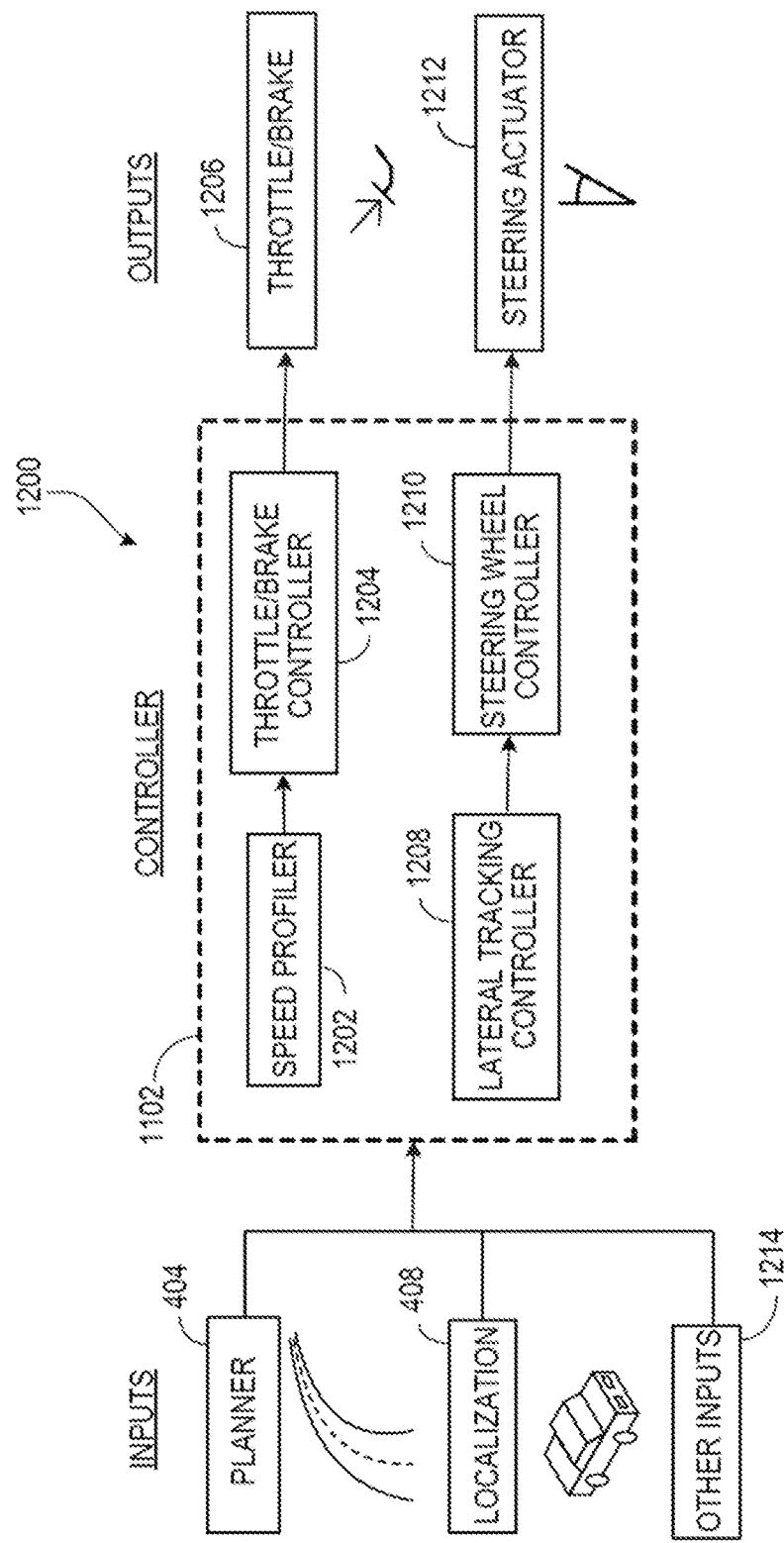
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Sensor Configuration

Figure 13:
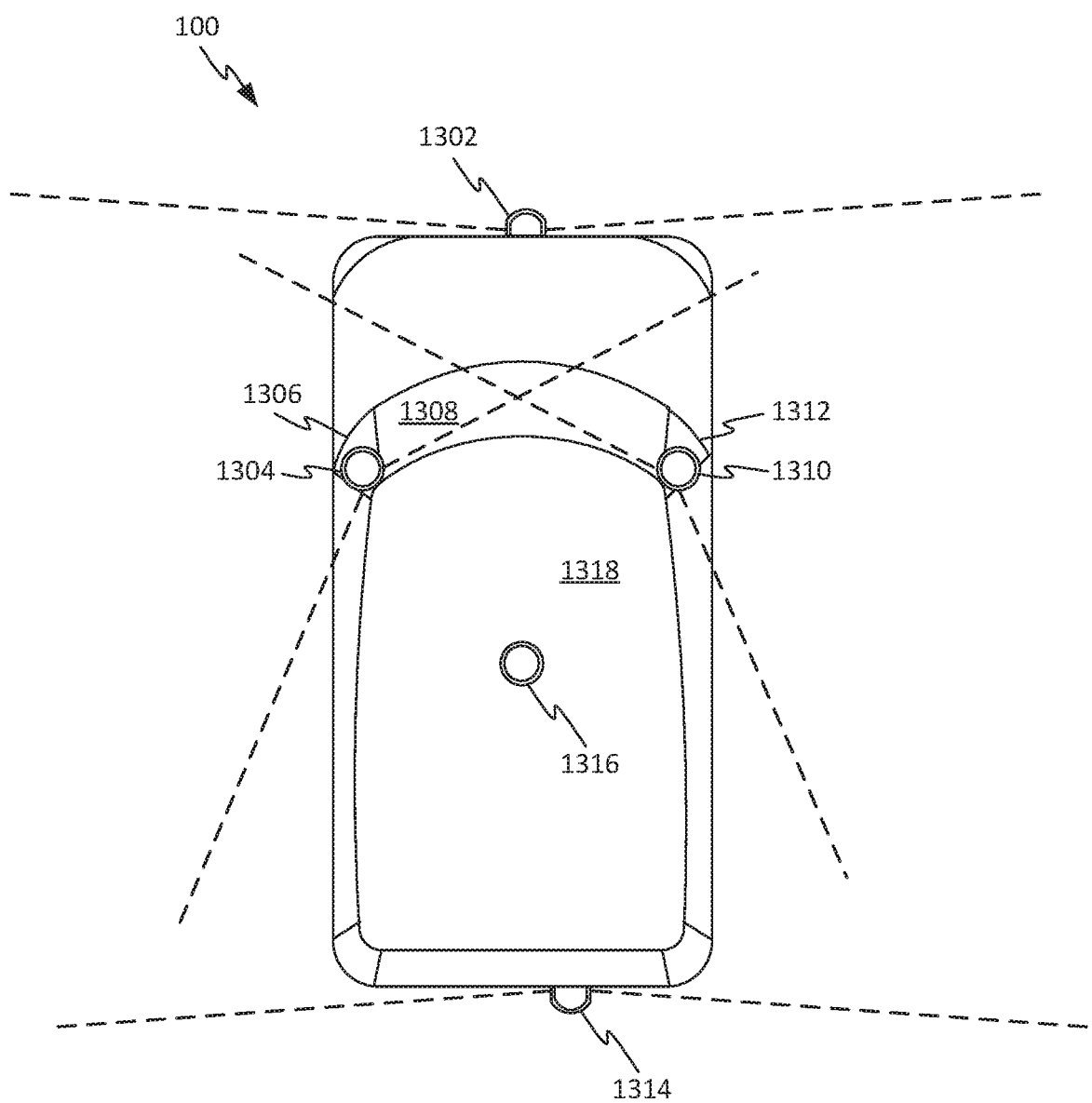
FIG. 13 shows a top view of a vehicle with multiple sensors supporting autonomous driving operations.

FIG. 13 shows a top view of AV 100 configured with multiple sensor assemblies for supporting autonomous guidance of AV 100 across various types of environments. Exemplary fields of view (indicated by dashed lines) associated with each of sensor assemblies 1302, 1304, 1310 and 1314 are depicted to show how the various mounting positions allow for larger or smaller amounts of visibility relative to the vehicle. For example, sensor assembly 1302 can take the form of a scanning LiDAR sensor configured to monitor traffic and other potentially obstructing objects directly in front of and to the sides of AV 100. The scanning LiDAR sensor example is provided for exemplary purposes only and it should be appreciated that other heat generating sensors supporting autonomous driving such as ultrasonic sensors, microphones, conventional cameras/videocameras, radar sensors and the like could benefit from being placed in a similarly configured enclosure. In some embodiments, mounting sensor assembly 1302 on or just above a front bumper of AV 100 allows sensor assembly 1302 to efficiently monitor and characterize low-profile road hazards that might otherwise be difficult to detect or properly characterize from a higher position on AV 100. Sensor assembly 1304 is shown mounted to a pillar 1306 positioned on the left side of windshield 1308 of AV 100. In this way, sensor assembly 1304 can share a height at which a driver's eyes are normally positioned and be positioned in a location that doesn't substantially block the view of a passenger sitting in the driver's seat and in some cases being ready to take over operation of AV 100 if needed. Sensor assembly 1310 can be mounted on a pillar 1312 to the right of windshield 1308. Together sensor assemblies 1304 and 1310 can cooperatively monitor objects in front of and to either side of AV 100 that can include areas normally within a blind spot of a driver of AV 100. Sensor assembly 1314 can be mounted near a rear bumper of AV 100 proximate a license plate of AV 100. In some embodiments, AV 100 may only include sensor assemblies 1302 and 1314 allowing for characterization of objects both in front of and behind AV 100. Finally AV 100 can include sensor assembly 1316 mounted atop AV 100 allowing for a 360 degree field of view. In some embodiments, AV 100 can be elevated above a rooftop 1318 of AV 100 by a support structure or scaffolding that allows sensor assembly 1316 to have direct line of sight to more objects positioned close to AV 100, allowing for improved visibility for optical sensors and better signal returns for non-imaging or acoustic sensors.

Sensor Cooling Using Conditioned Cabin Air

Figure 14:
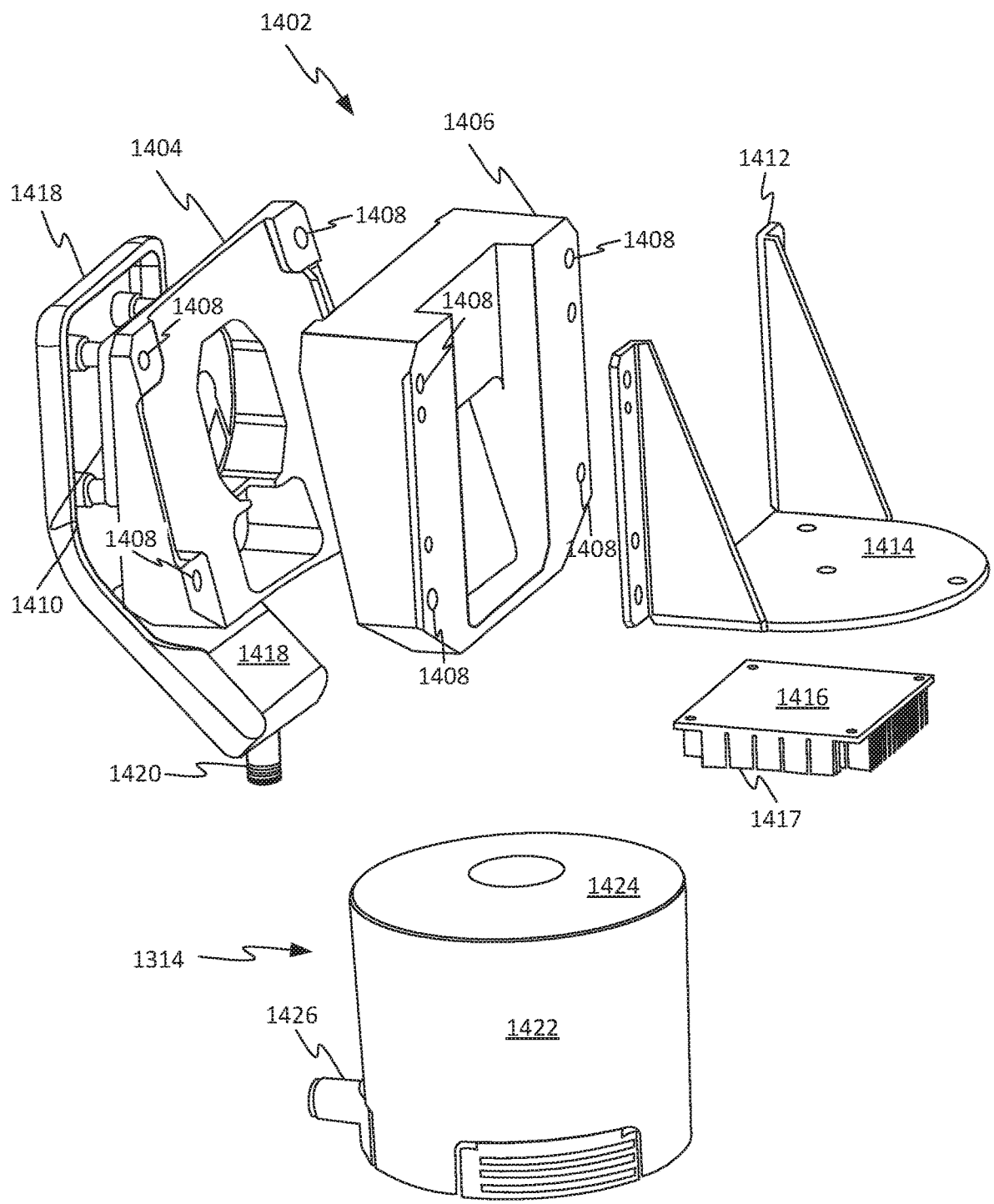
FIG. 14 shows an exploded view of a mounting bracket assembly configured to mount a sensor assembly to an exterior of a vehicle.

FIG. 14 shows an exploded view of a mounting bracket assembly 1402 configured to mount sensor assembly 1314 to an exterior of AV 100. While sensor assembly 1314 is positioned at a rear of AV 100 in FIG. 13, the configuration described below could be affixed to any other portion of AV 100, allowing for the use of conditioned air from different regions of the cabin of AV 100 to control a temperature a sensor assembly depending on a position of the sensor assembly. Mounting bracket assembly 1402 includes first mounting bracket 1404 and second mounting bracket 1406. First and second mounting brackets 1404 and 1406 both include fastener openings 1408 that allow mounting brackets 1404 and 1406 to be fastened together to form a duct path through which fan 1410 can source conditioned air from within AV 100 and driven through the housing of the sensor assembly 1314. In some embodiments, support structure 1412 can be integrally formed with second mounting bracket 1406 and provides a support plate 1414 having a first surface to which sensor assembly 1314 can be affixed. Alternatively and as depicted, support structure 1412 can take the form of a third bracket that is fastened to second mounting bracket 1406. Heat sink 1416 includes a number of cooling fins 1417 and can be affixed to a second surface opposite the first surface of support plate 1414.

A liquid shield 1418 is positioned behind fan 1410 and can be coupled to fan 1410. In this way, water that intrudes through the ducting defined by first and second mounting brackets 1404 and 1406 can be blocked by liquid shield 1418. Liquid shield 1418 includes a drain 1420 that allows water to be redirected to a drain channel or opening of AV 100 to return the liquid to an exterior of AV 100. A perspective view of sensor assembly 1314 is also depicted. In particular, sensor assembly 1314 can be a scanning LiDAR sensor that includes a sensor window 1422, a top cover 1424 and an electrical outlet conduit 1426, through which power and/or data can be provided to or received from the scanning LiDAR sensor positioned behind sensor window 1422. Sensor window 1422 can be optically transparent to wavelengths of light emitted by the scanning LiDAR sensor. For example, in some embodiments, sensor window 1422 is transparent to infrared wavelengths of light.

Figure 15:
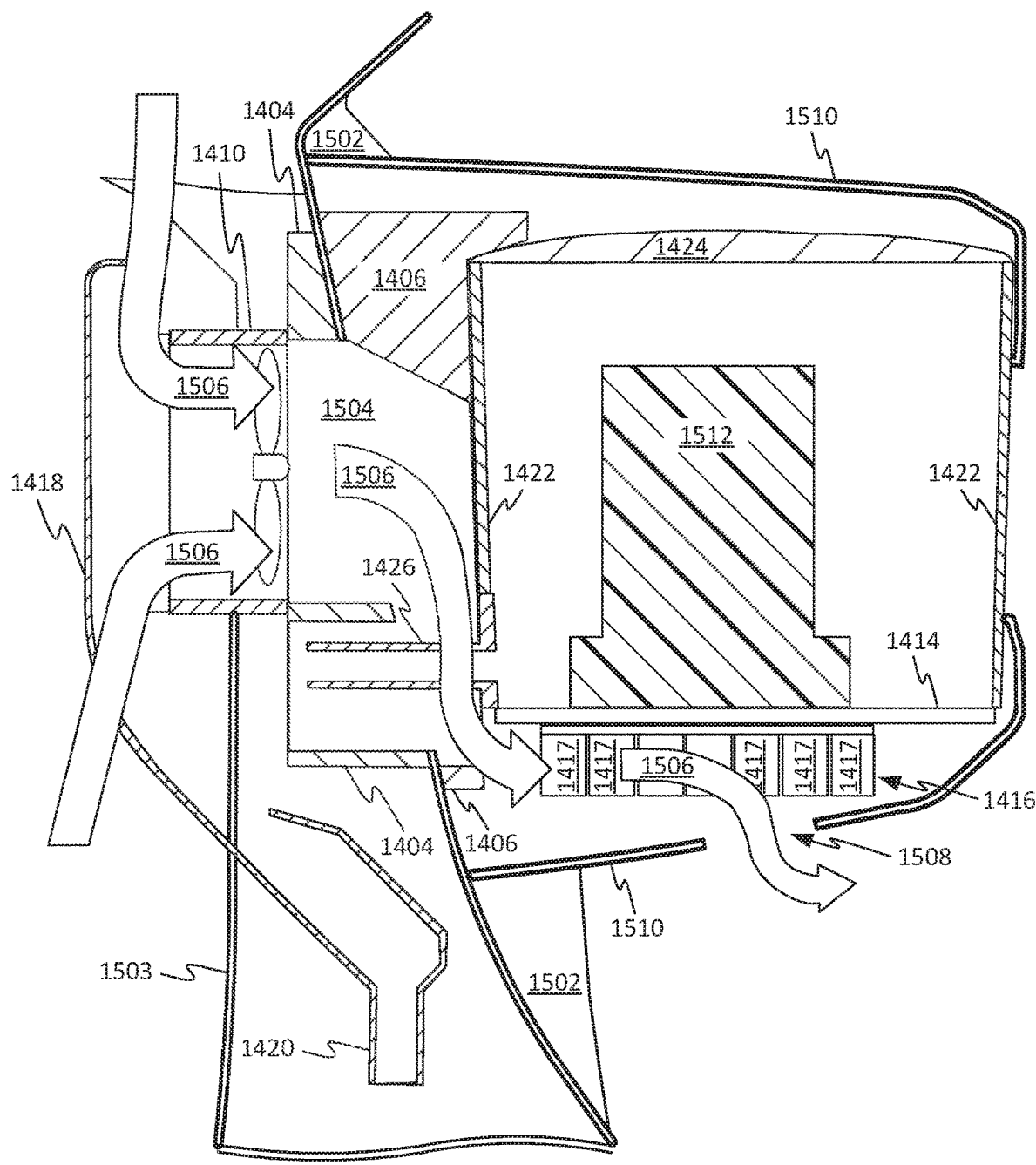
FIG. 15 shows a cross-sectional view of the sensor assembly depicted in FIG. 14 mounted to a recessed area of a body portion of a vehicle.

FIG. 15 shows a cross-sectional view of sensor assembly 1314 mounted to a recessed area of an exterior skin portion 1502 of AV 100. In particular, it depicts how first mounting bracket 1404 and second mounting bracket 1406 can be fastened together to compress and be secured against opposing sides of exterior skin portion 1502. First and second mounting brackets 1404 and 1406 also define a duct path 1504 extending through an opening in exterior skin portion 1502 of a bulkhead of AV 100. Fan 1410 is depicted and is coupled to both liquid shield 1418 and first mounting bracket 1404. Liquid shield 1418 blocks debris or liquid from entering an interior cabin of AV 100 by redirecting them down and out of AV 100 between exterior skin portion 1502 and interior skin portion 1503 and out of liquid shield 1418 through drain 1420. Operation of fan 1410 helps source conditioned air 1506 through duct path 1504, beneath support plate 1414, through channels defined by cooling fins 1417, and then out of one or more vents 1508 defined by housing cover 1510. Housing cover 1510, in cooperation with a sensor window 1422, a top cover 1424, and support plate 1414, form an enclosure that shields and protects LiDAR sensor 512 from an exterior environment. The conditioned air 1506 driven through the ducting is able to convectively exchange thermal energy with cooling fins 1417 of heat sink 1416, which helps regulate a temperature of LiDAR sensor 1512. A monitoring system can be configured to determine when external temperatures are high and then source cool, conditioned air from within a cabin area of AV 100 to dissipate heat generated by LiDAR sensor 1512. When the monitoring system determines the external temperatures are low, warm, conditioned air from within the cabin area of AV 100 is sourced to transfer heat to heat sink 1416, which is then thermally conducted to LiDAR sensor 1512 through support plate 1414. Operation of fan 1410 also creates an increased pressure region proximate one or more vents 1508. The increased pressure region helps prevent the ingress of unwanted debris or liquid into housing cover 1510.

Figure 16:
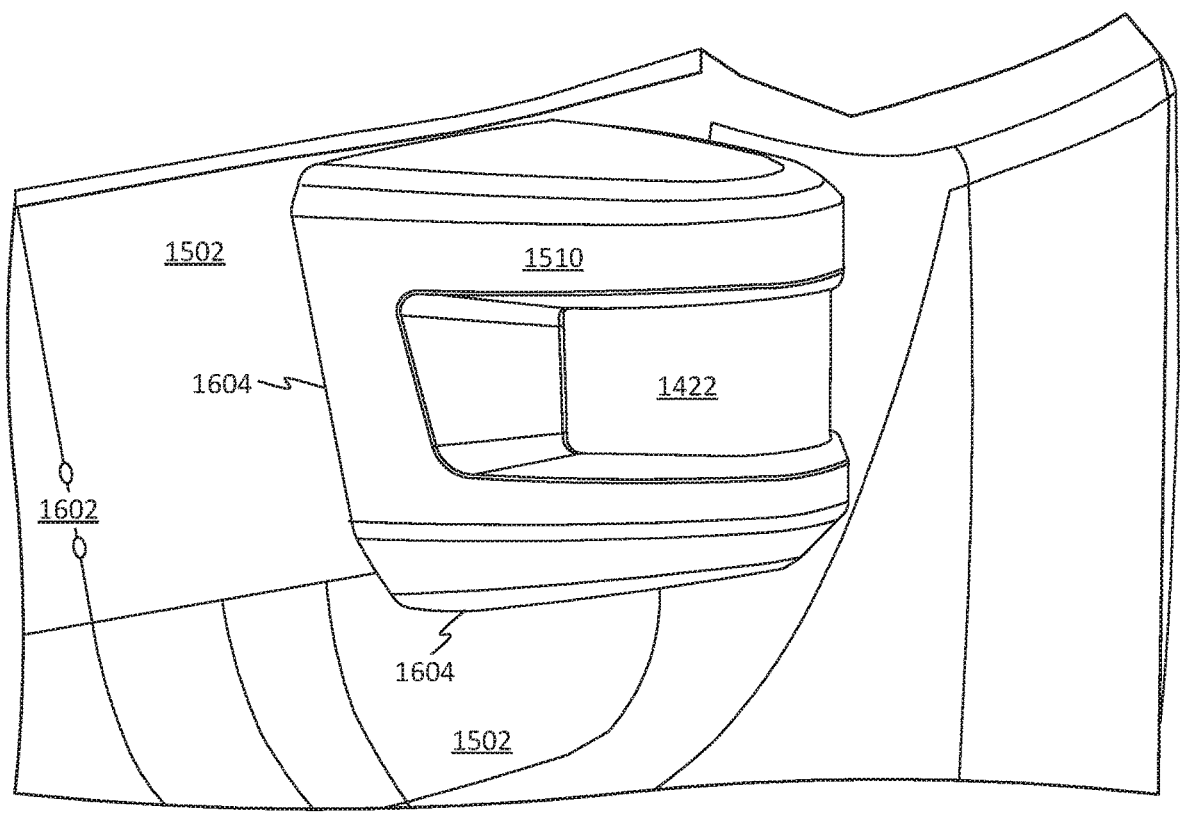
FIG. 16 shows a perspective view of a sensor assembly affixed to an exterior surface of a body portion and proximate a license plate region.

FIG. 16 shows a perspective view of sensor assembly 1314 affixed to an exterior surface of exterior skin portion 1502 and proximate license plate region 1602. Exterior skin portion 1502 can be at least slightly recessed, which further helps to reduce a likelihood of debris or liquid entering within housing cover 1510. An environmental seal can be positioned at an interface 1604 between housing cover 1510 and exterior skin portion 1502 that blocks liquid from intruding through interface 1604.

Sensor Cooling Using Structural Heat Sink

Figure 17A:
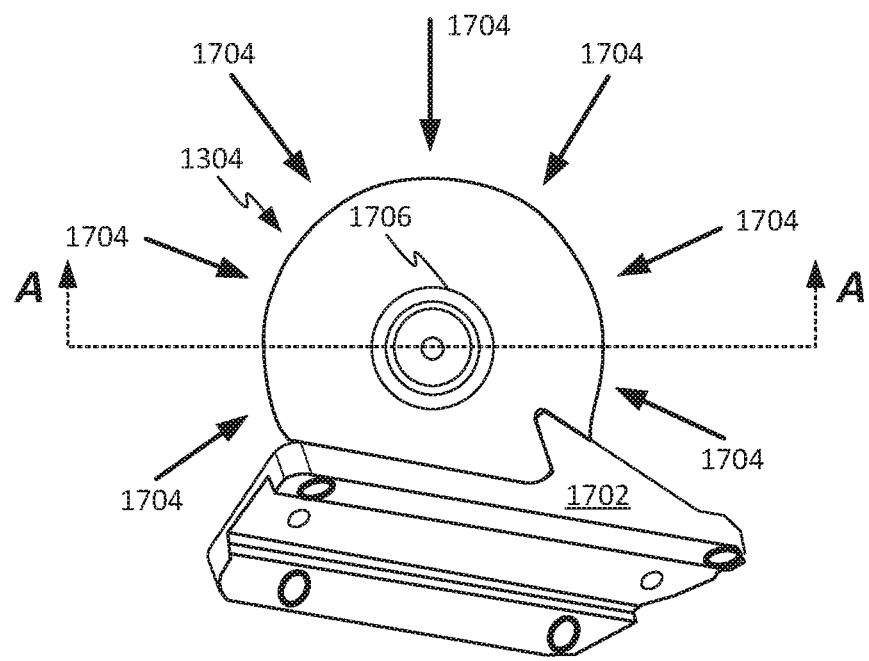
FIG. 17A shows a bottom view of a sensor assembly.

FIG. 17A shows a bottom view of sensor assembly 1304. Sensor assembly 1304 is shown attached to a bracket 1702, which can be used to attach sensor assembly 1304 to pillar 1306, as depicted in FIG. 13. FIG. 17A also shows that a sensor assembly 1304 can be configured so that ambient air 1704 is able to enter and convectively dissipate heat from a heat sink from multiple different radial directions. An outlet opening 1706 is disposed at a central portion of a downward facing surface of sensor assembly 1304.

Figure 17B:
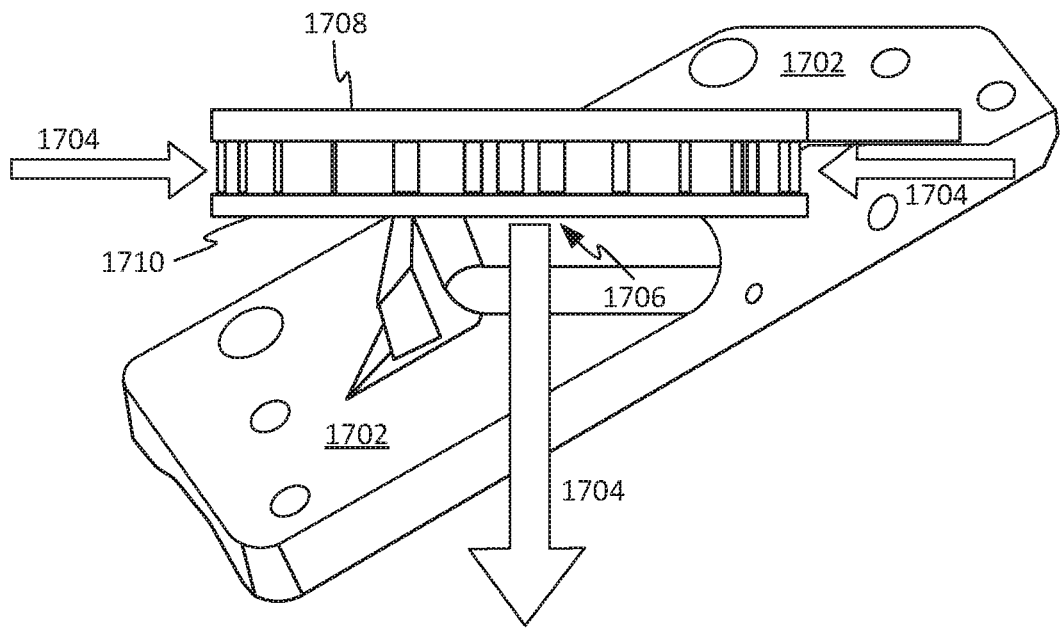
FIG. 17B shows a side view of the sensor assembly depicted in FIG. 17A.

FIG. 17B shows a side view of heat sink 1708 of sensor assembly 1304 attached to bracket 1702. After dissipating heat generated by sensor assembly 1304 from heat sink 1708, ambient air 1704 exits sensor assembly 1304 through outlet opening 1706, which is defined by heat sink cover 1710. Heat sink cover 1710 cooperates with heat sink 1708 to define discrete ducts through which ambient air flows to dissipate heat from sensor assembly 1304.

Figure 17C:
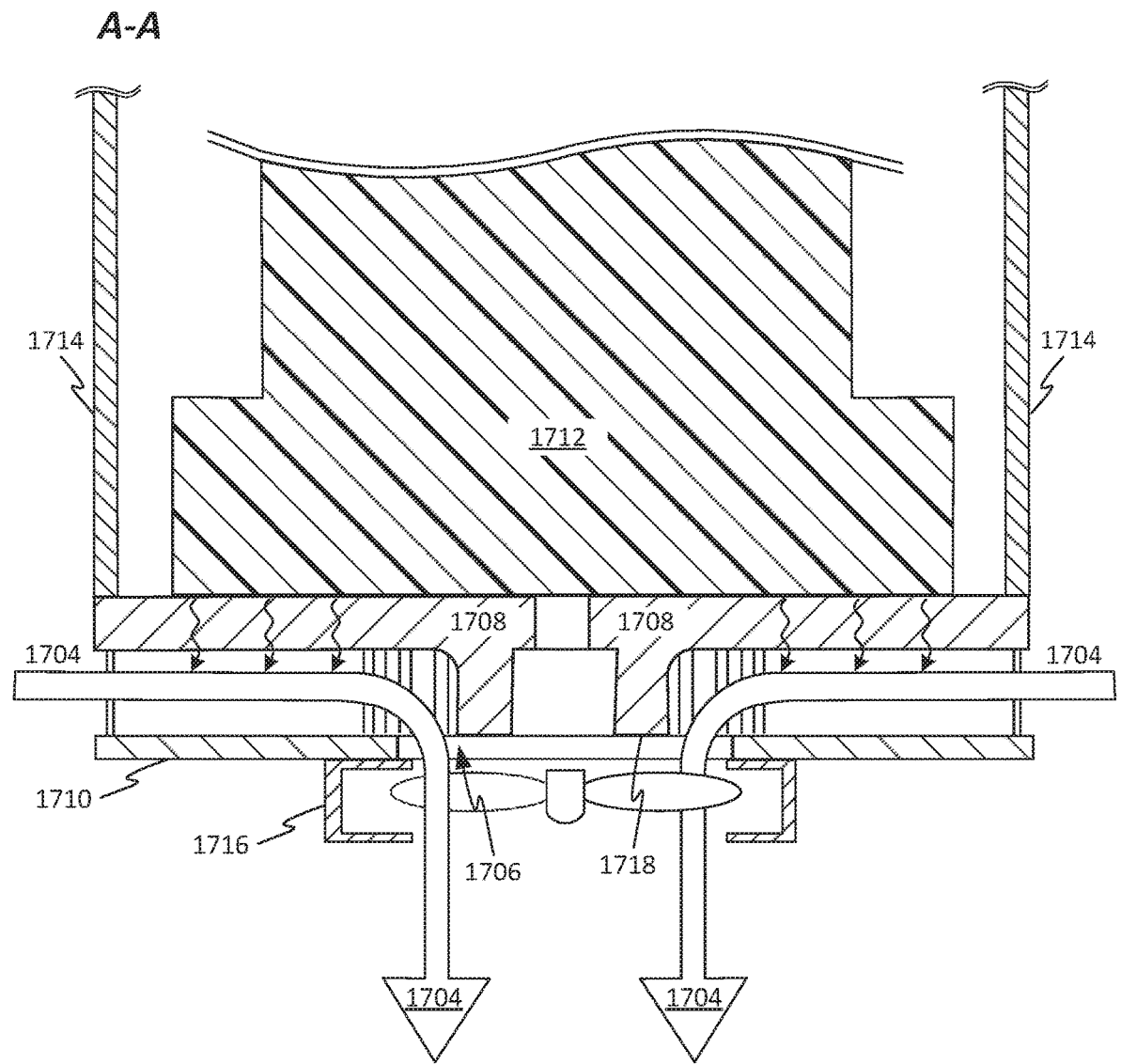
FIG. 17C shows a cross-sectional side view of the sensor assembly depicted in FIG. 17A-17B in accordance with section line A-A of FIG. 17A.

FIG. 17C shows a cross-sectional side view of sensor assembly 1304 in accordance with section line A-A from FIG. 17A. In particular, optical sensor 1712 and sensor window 1714 are shown being supported by heat sink 1708, allowing heat sink 1708 to act as both a heat dissipation mechanism and a structural support member. In some embodiments, optical sensor 1712 takes the form of a LiDAR sensor and heat sink cover 1710 is fastened to one or more cooling fins of heat sink 1708. Fan 1716 can be positioned at outlet opening 1706 of heat sink cover 1710. Multiple ducts are cooperatively defined by heat sink 1708 and heat sink cover 1710. In this way, fan 1716 is able to draw ambient air 1704 radially inward from a first open end of each of the ducts toward a second open end of each of the ducts defined by outlet opening 1706. Ambient air 1704 is redirected vertically downward by the pressure gradient created by fan 1716 and a central protrusion 1718 of heat sink 1708 that also helps guide ambient air 1704 through outlet opening 1706.

In some embodiments, fan 1716 may only need to operate when AV 100 is halted or traveling at a slow speed that is insufficient to drive an amount of ambient air across heat sink 1708 to keep optical sensor 1712 operating within a safe range of operating temperatures. In some embodiments, operation of fan 1716 is associated with temperature data from a temperature sensor incorporated within optical sensor 1712 or thermally coupled with heat sink 1708. For example, the temperature sensor could take the form of a thermocouple, resistance thermometer or silicon bandgap temperature sensor.

Figure 17D:
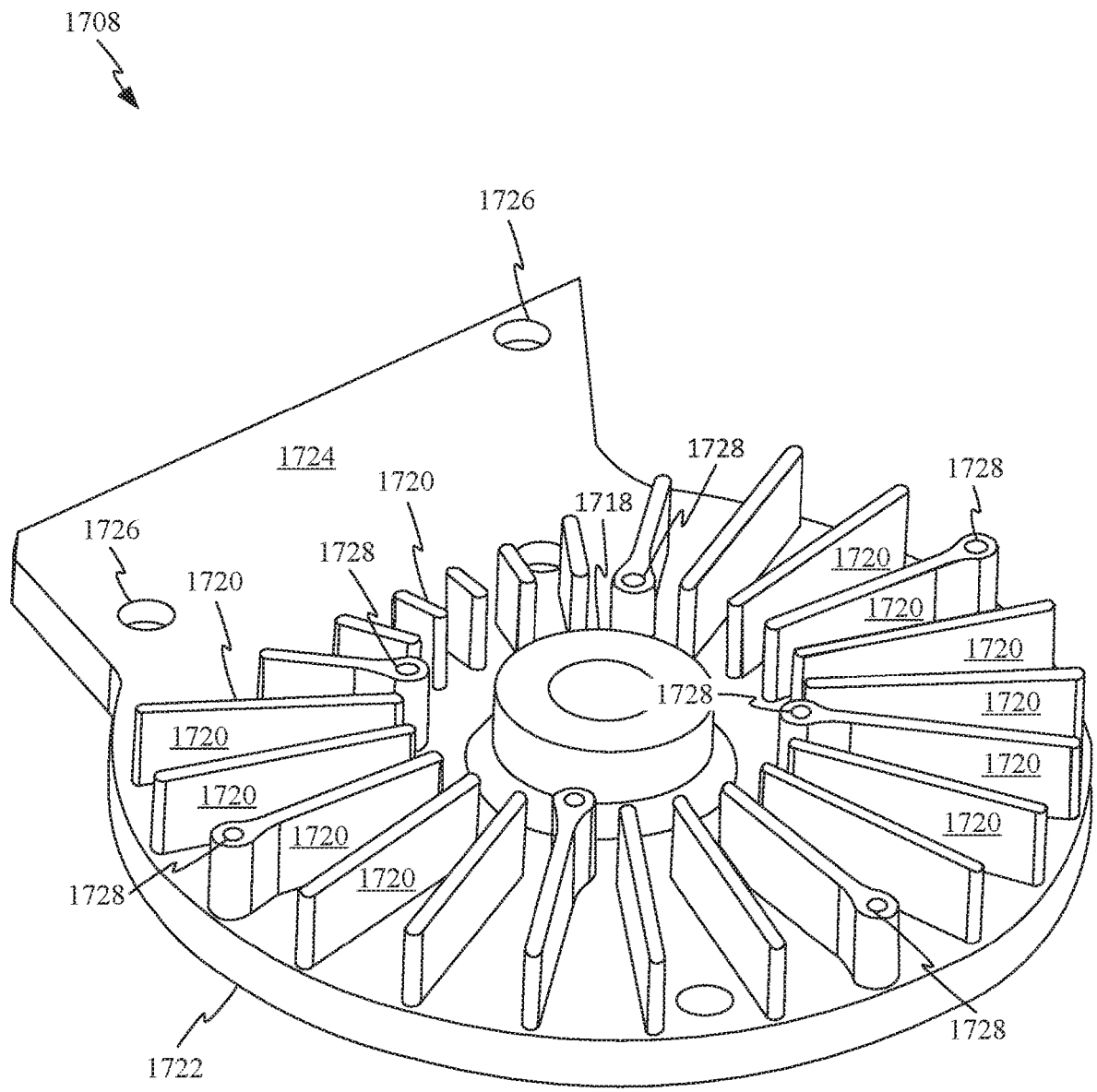
FIG. 17D shows a perspective view of a heat sink having an exemplary radial cooling fin configuration.

FIG. 17D shows a perspective view of heat sink 1708 having an exemplary radial cooling fin configuration. As depicted, each of cooling fins 1720 can be integrally formed with a base 1722 of heat sink 1708. Heat sink 1708 can be formed from thermally conductive materials such as stainless steel or aluminum. In some embodiments, cooling fins 1720 are fused to base 1722 and in other embodiments cooling fins 1720 and central protrusion 1718 can be formed by a subtractive manufacturing process by in which machining tools remove material from a single block of thermally conductive material to form heat sink 1708. In addition to providing an increased amount of surface area from which heat can be convectively dissipated, cooling fins 1720 can also act as structural ribs that increase the overall strength of heat sink 1708. Base 1722 of heat sink 1708 also includes an attachment feature 1724 with fastener opening 1726. Fasteners can extend through fastener opening 1726 to secure heat sink 1708 directly to bracket 1702. Select cooling fins 1720 of heat sink 1708 can include a fin fastener opening 1728 that can be used to attach heat sink cover 1710 to select cooling fins 1720. As depicted, fin fastener openings can be positioned along a periphery of heat sink 1708 or near a central region of heat sink 1708. By varying the position of fin fastener openings 1728 with respect to their associated cooling fin both central and peripheral portions of heat sink cover 1710 can be secured to heat sink 1708. While not specifically depicted fin fastener openings 1728 can also be positioned on a central portion of one or more of cooling fins 1720. It should be noted that while the air flow is depicted entering laterally and then being redirected downward in the preceding figures, when AV 100 is travelling at high speeds at least some of the ambient air flowing through heat sink 1708 may flow around and past central protrusion 1718 and exit laterally through an opposite side of heat sink 1708. This is enabled by the gap between cooling fins 1720 and central protrusion 1718. Furthermore, while a specific cooling fin configuration is shown by FIG. 17D, other fin configurations could be applied. For example, a heat sink could instead have a parallel cooling fins configuration that would allow all the ambient air entering heat sink 1708 to flow from one side of heat sink 1708 to another without being redirected downward.

Figure 18:
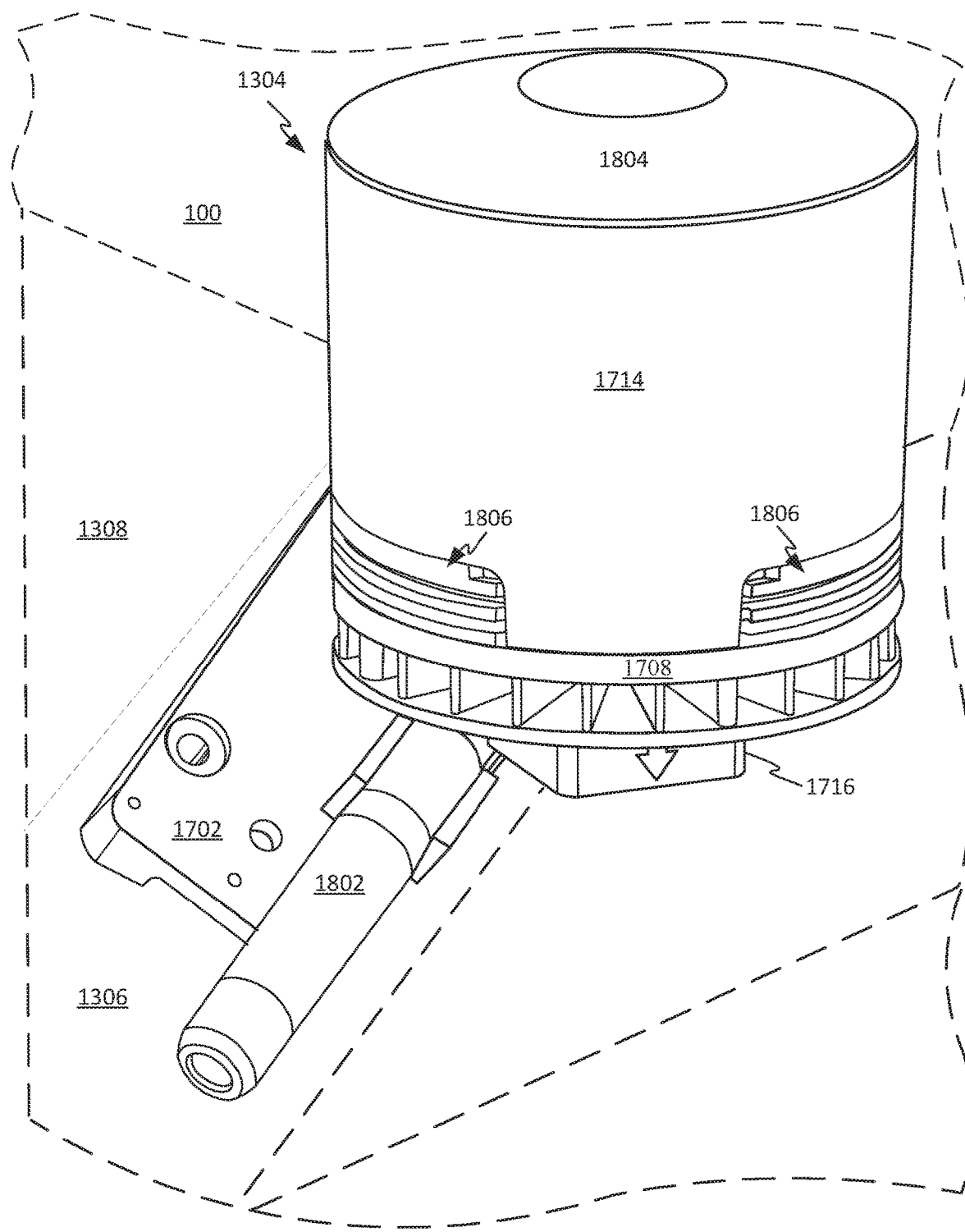
FIG. 18 shows a perspective view of the sensor assembly depicted in FIGS. 17A-17D affixed to a vehicle.

FIG. 18 shows a perspective view of sensor assembly 1304 affixed to AV 100. AV 100 is shown with dashed lines to emphasize the features of sensor assembly 1304. In some embodiments, bracket 1702 is concealed below an exterior or cosmetic cover of AV 100. The cosmetic cover can take the form of a hood, bumper trim, fender, tailgate/trunk lid, etc. Sensor assembly 1304 can also include a wiring conduit 1802 that is also concealed below the exterior panel and configured to route electricity to and data to and from a sensor of sensor assembly 1304. In some embodiments, wiring conduit 1802 is configured to gather ambient air from beneath the exterior cover where the air is less likely to be disturbed. Wiring conduit 1802 can then be configured to guide the gathered air across cooling fins 1720 of heat sink

1708. Gathering the air in this manner reduces the likelihood of turbulent air flow disturbing the flow of air across cooling fins 1720. In some embodiments, the air gathered by wire conduit 1802 is directed across cooling fins of heat sink 1708 by guiding the air through an opening in heat sink cover 1710. Such a configuration could include a cooling fin configuration that was not radial in nature and the opening could be positioned near a front end of the heat sink to allow air to enter into heat sink 1708 by way of wire conduit 1802 and laterally through open ends of ducting defined by heat sink 1708. Both air intake mechanisms are positioned so that accumulating rain or snow does not enter in any substantial amount into heat sink 1708, thereby preventing blockage of any air paths. The exterior panel and downward orientation of wire conduit 1802 prevents substantial amounts of water or snow ingress into the ducting of heat sink 1708. Further, the presence of sensor window 1714 and cover 1804 shields laterally oriented open ends of the ducts of the heat sink from being blocked by rain or accumulated snow.

FIG. 18 also shows an external appearance of fan 1716, which can provide a measure of protection by blocking water from splashing up into the air outlet for heat sink 1708. When fan 1716 is in operation the spinning fan blades and pressure gradient generated by operation of fan 1716 further discourages the flow of debris or water through the air outlet. FIG. 18 also shows how additional heat dissipation mechanisms can be arranged along a side of sensor assembly 1304. In some embodiments, cooling fins 1806 are positioned along a base of sensor window 1714 and configured to receive heat generated by optical sensor 1712 (not depicted, see FIG. 17C). In this way, thermal energy can be conducted both vertically downward and laterally outward from optical sensor 1712.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the claims, and what is intended by the applicants to be the scope of the claims, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

In some embodiments, a system includes a first mounting bracket including a first duct path, the first mounting bracket configured to mount to an interior surface of a vehicle and to direct air from a cabin area of the vehicle through the first duct path; a fan coupled to the first mounting bracket, the fan positioned between the cabin area and the first mounting bracket, wherein the fan is configured to: source air from the cabin area; and direct the sourced air through both the first duct path and a duct path in a body portion of the vehicle; a second mounting bracket including a second duct path, an upper section configured to mount to a sensor, and a lower section, wherein the second mounting bracket is configured to: mount to an exterior surface of the vehicle; receive the sourced air from the duct path in the body portion of the vehicle; and direct the sourced air in the second direction through the second duct path, wherein the first duct path and the second duct path are positioned on opposite sides of the duct path in the body portion; and a heat sink configured to attach to the lower section of the second mounting bracket and below the sensor, wherein the second mounting bracket is configured to direct the sourced air to the heat sink via the second duct path.

In some embodiments, the system further comprises a housing cover that in cooperation with the second duct path guides the sourced air across the heat sink.

In some embodiments, the housing cover shields the duct path from water intrusion.

In some embodiments, the system further comprises a liquid shield, the fan being disposed between the liquid shield and the first mounting bracket.

In some embodiments, the liquid shield is configured to redirect water entering the cabin area toward a drain through which the water is configured to exit the vehicle.

In some embodiments, the system further comprises a control system configured to vary an operating state of the fan in accordance with a thermal output of the sensor, wherein the sensor is a LiDAR sensor.

In some embodiments, the system further comprises a monitoring system coupled to the heat sink and configured to provide the thermal output of the sensor to the control system.

In some embodiments, a system comprises: an enclosure configured to enclose and support a sensor; a heat sink coupled to a base of the enclosure and configured to receive heat generated by the sensor; a mounting bracket assembly configured to secure the enclosure to an exterior surface of a vehicle, the mounting bracket assembly comprising ducting configured to define at least a portion of an airway extending from an interior of the vehicle, through a bulkhead of the vehicle and to the heat sink; and a fan configured to draw air from within a cabin area of the vehicle, push the air through the ducting and across the heat sink to control a temperature of the sensor.

In some embodiments, the mounting bracket assembly comprises: a first mounting bracket configured to be mounted to an interior surface of the vehicle, the first mounting bracket defining a first portion of the ducting; and a second mounting bracket configured to be coupled to the exterior surface of the vehicle, and the enclosure, the second mounting bracket being separated from the first mounting bracket by an exterior skin portion of the bulkhead and defining a second portion of the ducting, wherein the first and second portions of the ducting are configured to align with an opening defined by the exterior skin portion of the bulkhead to define a portion of the airway.

In some embodiments, the first mounting bracket is disposed within an interior of the bulkhead between the exterior skin portion and an interior skin portion of the bulkhead.

In some embodiments, the system further comprises a liquid shield configured to guide water entering the cabin area through the ducting to a drain within the bulkhead that guides the water to the exterior of the vehicle.

In some embodiments, the fan is mounted to the first mounting bracket and disposed between the liquid shield and the first mounting bracket.

In some embodiments, the heat sink comprises a plurality of cooling fins.

In some embodiments, the system further comprises an exterior cover shielding the base of the enclosure and the heat sink, the exterior defining a plurality of vents through which the air pushed across the heat sink exits the system.

In some embodiments, the sensor is a LiDAR sensor.

In some embodiments, a vehicle includes the following: a sensor; an enclosure enclosing and supporting the sensor, the enclosure comprising a sensor window configured to accommodate the passage of electromagnetic waves to and from the sensor; a heat sink coupled to a base of the enclosure and configured to receive heat generated by the sensor; a vehicle body defining a cabin area; a mounting bracket assembly securing the enclosure to an exterior surface of the vehicle body, the mounting bracket comprising ducting that defines at least a portion of an airway extending from an interior of the vehicular body, through a bulkhead of the vehicle body and to the heat sink; and a fan configured to draw air from the cabin area within the vehicle body, push the air through the ducting and across the heat sink to control a temperature of the sensor.

In some embodiments, the heat sink comprises a plurality of parallel cooling fins.

In some embodiments, the sensor is an optical sensor.

In some embodiments, the vehicle further comprises a liquid shield configured to redirect water entering the cabin through the ducting toward a drain through which the water is configured to exit the vehicle.

In some embodiments, the mounting bracket assembly comprises: a first mounting bracket mounted to an interior surface of the vehicle, the first mounting bracket defining a first portion of the ducting; and a second mounting bracket configured to be coupled to the exterior surface of the vehicle, and the enclosure, the second mounting bracket being separated from the first mounting bracket by an exterior skin portion of the bulkhead and defining a second portion of the ducting, wherein the first and second portions of the ducting are configured to align with an opening defined by the exterior skin portion of the bulkhead to define a portion of the airway.

What is claimed is:

1. A system, comprising:
    a mounting bracket assembly configured to mount to a sensor to an exterior surface of a vehicle, the mounting bracket assembly comprising:
        a first mounting bracket and a second mounting bracket, the first mounting bracket configured to be secured against an interior side of an exterior skin of a vehicle and the second mounting bracket configured to be secured against an exterior side the exterior skin of the vehicle,
        a support structure coupled to the second mounting bracket, the support structure comprising a support plate having an upper surface and a lower surface,
        a liquid shield coupled to an interior side of the first mounting bracket, the liquid shield configured to collect water entering through the mounting bracket assembly and direct it to a drain, and
        a fan positioned between the liquid shield and the first mounting bracket, the fan configured to source condition air from an interior of the vehicle and direct it through a duct formed through the first and second mounting brackets; and
    a heat sink coupled to the lower surface of the support plate of the support structure, the heat sink comprising cooling fins;
    wherein the sensor is coupled to the upper surface of the support plate of the support structure, and housing cover surrounds the sensor, the support plate, and the heat sink, the housing cover including a vent positioned below the heat sink,
    wherein the duct is configured to direct the conditioned air into the housing cover, across the cooling fins of the heat sink, and out the vent convectively dissipate heat from the heat sink.

2. The system as recited in claim 1, wherein a first open end of the duct is configured to be positioned beneath a cosmetic cover of the vehicle.

3. The system as recited in claim 1, wherein the cooling fins of the heat sink are distributed radially across a surface of the heat sink.

4. The system as recited in claim 1, wherein the sensor is a LiDAR sensor.

5. The system as recited in claim 1, wherein the heat sink comprises a plurality of radially distributed cooling fins arranged along a surface of a base of the heat sink.

6. The system as recited in claim 5, wherein the radially distributed cooling fins are configured to define a plurality of ducts, guide incoming air into a central region of the heat sink and then redirect the air axially downward through respective second open ends associated with each duct of the plurality of ducts.

7. The system as recited in claim 1, further comprising a monitoring system configured to measure a temperature of the heat sink and change the operational state of the fan in accordance with the measured temperature of the heat sink.

8. A system, comprising:
    a mounting bracket assembly configured to secure a sensor to an exterior of a vehicle, the mounting bracket assembly comprising:
        a first mounting bracket and a second mounting bracket, the first mounting bracket configured to be secured against an interior side of an exterior skin of a vehicle and the second mounting bracket configured to be secured against an exterior side the exterior skin of the vehicle,
        a support structure coupled to the second mounting bracket, the support structure comprising a support plate having an upper surface and a lower surface,
        a liquid shield coupled to an interior side of the first mounting bracket, the liquid shield configured to collect water entering through the mounting bracket assembly and direct it to a drain, and
    a fan positioned between the liquid shield and the first mounting bracket, the fan configured to source condition air from an interior of the vehicle and direct it through a duct formed through the first and second mounting brackets;
    a heat sink coupled to a lower surface of the support plate configured to dissipate heat emitted by the sensor, wherein the sensor is coupled to the upper surface of the heat sink;
    a housing configured to surround the sensor, the support plate, and the heat sink, the housing comprising:
        an optically transparent sensor window configured to accommodate the passage of electromagnetic waves to and from the system, and
        a vent positioned below the heat sink
    wherein the duct is configured to direct the conditioned air from within a cabin area of the vehicle across the heat sink to to vent to the exterior of the vehicle.

9. The system as recited in claim 8, wherein the optically transparent sensor window comprises a cylindrical body, the cylindrical body and heat sink coupled together to define an interior volume sized to accommodate the sensor.

10. The system as recited claim 8, wherein the heat sink comprises a plurality of cooling fins arranged in a radial pattern across a face of the heat sink.

11. The system as recited in claim 8, wherein a first end of the heat sink is coupled to the support plate to form a cantilevered support structure configured to support the weight of the sensor.

* * * * *

UNITED STATES PATENT AND TRADEMARK OFFICE
CERTIFICATE OF CORRECTION

| | | |
|---|---|---|
| PATENT NO. | : 11,940,234 B2 | Page 1 of 1 |
| APPLICATION NO. | : 17/004644 | |
| DATED | : March 26, 2024 | |
| INVENTOR(S) | : Thorin Tobiassen | |

It is certified that error appears in the above-identified patent and that said Letters Patent is hereby corrected as shown below:

In the Specification

Column 3, Line 8, delete "FIG." and insert -- FIGS. --.

In the Claims

Column 24, Line 55 (approx.), Claim 8, delete "sink to to" and insert -- sink to --.

Column 24, Line 55 (approx.), Claim 8, delete "vent" and insert -- the vent --.

Column 24, Line 60 (approx.), Claim 10, delete "recited" and insert -- recited in --.

Signed and Sealed this
Eleventh Day of June, 2024

*Katherine Kelly Vidal*

Katherine Kelly Vidal
*Director of the United States Patent and Trademark Office*